United States Patent [19]

Aoyagi

[11] Patent Number: 5,588,103
[45] Date of Patent: Dec. 24, 1996

[54] DOCUMENT EDITOR HAVING FUNCTION FOR CONTROLLING DISPLAY PROCESSING OF DETAILS

[75] Inventor: Yoshihiko Aoyagi, Kawasaki, Japan

[73] Assignee: Fujitsu Limited, Kawasaki, Japan

[21] Appl. No.: 274,691

[22] Filed: Jul. 14, 1994

[30] Foreign Application Priority Data

Oct. 5, 1993 [JP] Japan .................. 5-249169

[51] Int. Cl.$^6$ .................. G06F 15/00
[52] U.S. Cl. .................. 395/326
[58] Field of Search .................. 395/155–166

[56] References Cited

U.S. PATENT DOCUMENTS 5,444,842  8/1995  Benkon .................. 395/161

FOREIGN PATENT DOCUMENTS 63-109578  5/1988  Japan .
3-154171   7/1991  Japan .

Primary Examiner—Kee M. Tung
Assistant Examiner—U. Chauhan
Attorney, Agent, or Firm—Staas & Halsey

[57] ABSTRACT

A document editor for editing and displaying elements of a graphic with a logic structure which have an inclusive, side-by-side, or connective relationship mutually. The document editor comprises an editing unit for editing any element of said logic structure and reflecting the result of editing on other elements, an output unit for externally displaying the result of reflective editing, if necessary, and a control unit for designating display or non-display of the result of reflective editing for each element of said logic structure, and controlling the output unit in terms of display or non-display of the result of reflective editing according to the designation. By the constitution, during document editing and display, stepwise display of details can be controlled according to a logic structure, and any element can be edited in a selected display stage. Eventually, the constitution contributes to a reduction in the quantity of display information and a display time interval.

4 Claims, 15 Drawing Sheets

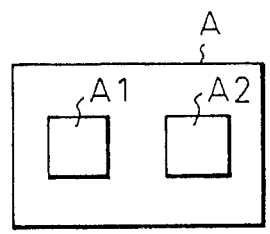
Fig.1a
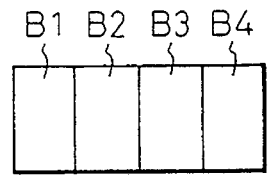
Fig.1b
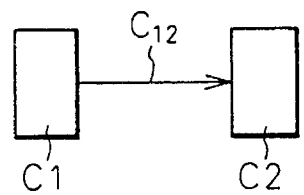
Fig.1c
Fig.2
PRIOR ART
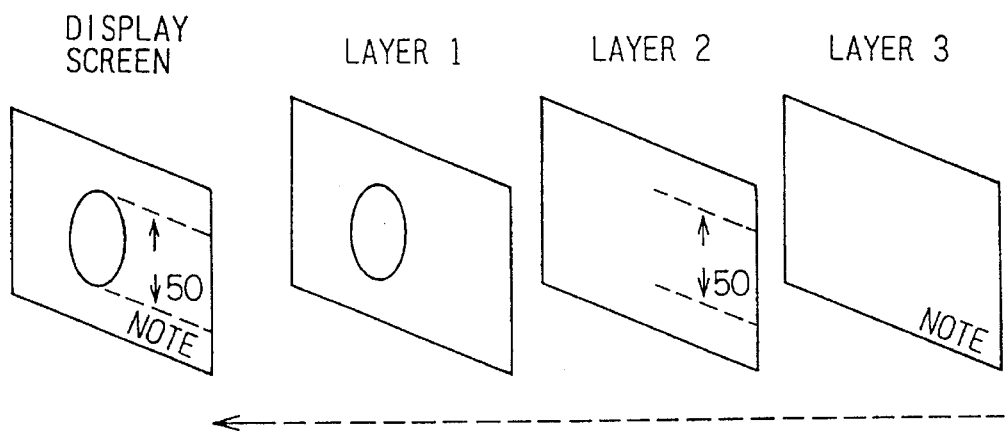

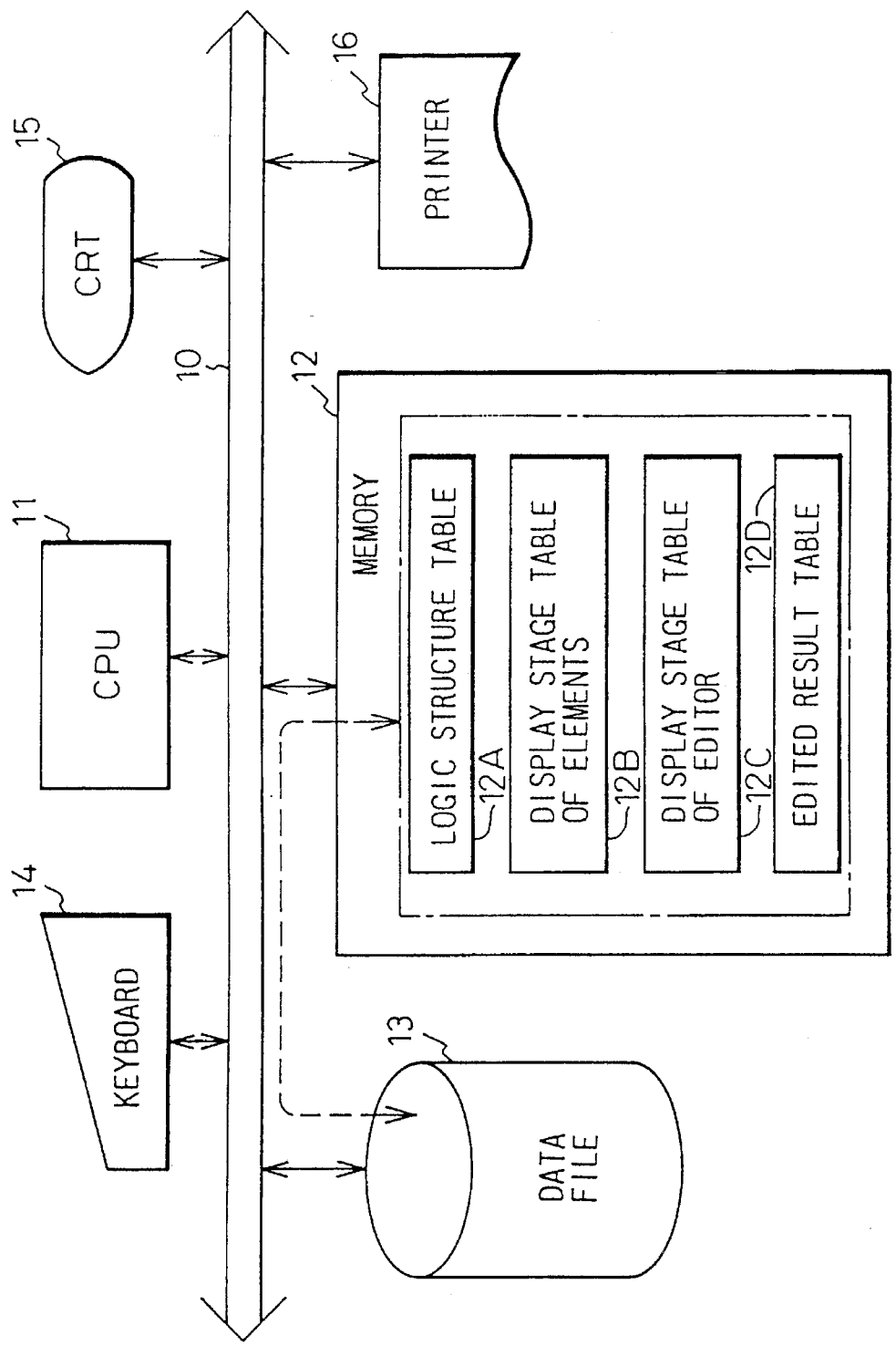

Fig.5a

| ELEMENT OF LOGIC STRUCTURE | DISPLAY STAGE | | |
|---|---|---|---|
| | 1 | 2 | 3 |
| DECISION TABLE | ○ | ○ | ○ |
| ROWS OF DECISION TABLE | ○ | ○ | — |
| CHARACTER FIELDS OF ROWS OF DECISION TABLE | ○ | — | — |
| CONNECTION LINE | ○ | ○ | ○ |

○: DISPLAY , —: NON-DISPLAY

Fig.5b (DISPLAY STAGE 1)

| A>B | Y | N | | | | |
|---|---|---|---|---|---|---|
| C=A | X | | | | | |
| C=B | | X | | | | |

| X>Y | Y | N | | | | |
|---|---|---|---|---|---|---|
| Z=X | X | | | | | |
| Z=Y | | X | | | | |

Fig.5c (DISPLAY STAGE 2)

Fig.5d (DISPLAY STAGE 3)

Fig. 6

| NAME OF ELEMENT | LOGIC STRUCTURE | | SHAPE OF LINE DRAWING |
|---|---|---|---|
| | TYPE | OBJECT (NOTE 1) | |
| RECTANGLE 1 | SIDE BY SIDE | RECTANGLE 2 | RECTANGLE |
| RECTANGLE 2 | INCLUSION | RECTANGLE 3 | RECTANGLE |
| RECTANGLE 3 | CHARACTER | — | RECTANGLE |
| CONNECTION LINE 1 | CONNECTION LINE | RECTANGLE 1, RECTANGLE 1 | ARROW |

NOTE 1: ACCORDING TO TYPE OF LOGIC STRUCTURE, OBJECT IS AS FOLLOWS:
"SIDE BY SIDE"; ELEMENT BEING SIDE BY SIDE.
"INCLUSION"; ELEMENT TO BE INCLUDED.
"CONNECTION LINE"; ELEMENTS OF SOURCE AND DESTINATION OF CONNECTION.

Fig. 7

| NAME OF ELEMENT | DISPLAY STAGE | | |
|---|---|---|---|
| | 1 | 2 | 3 |
| RECTANGLE 1 | ◯ | ◯ | ◯ |
| RECTANGLE 2 | ◯ | ◯ | — |
| RECTANGLE 3 | ◯ | — | — |
| CONNECTION LINE 1 | ◯ | ◯ | ◯ |

◯: DISPLAY , —: NON-DISPLAY

Fig. 8

| DISPLAY STAGE | | |
|---|---|---|
| 1 | 2 | 3 |
| ◯ | ◯ | ◯ |

※: RESPECTIVE SHAPE INFORMATION FOR DISPLAY (RECTANGLE, CONNECTION LINE, ETC.)

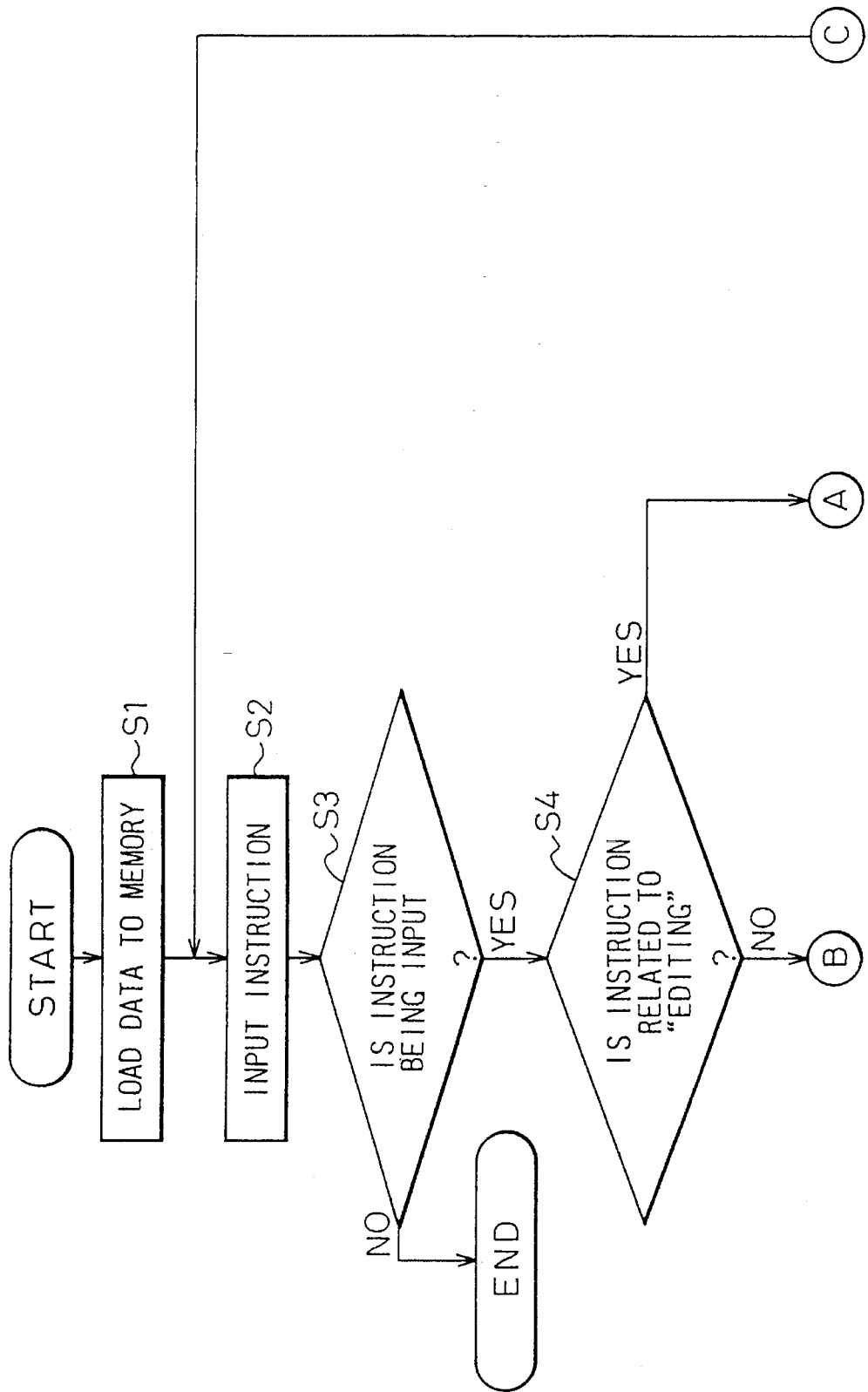

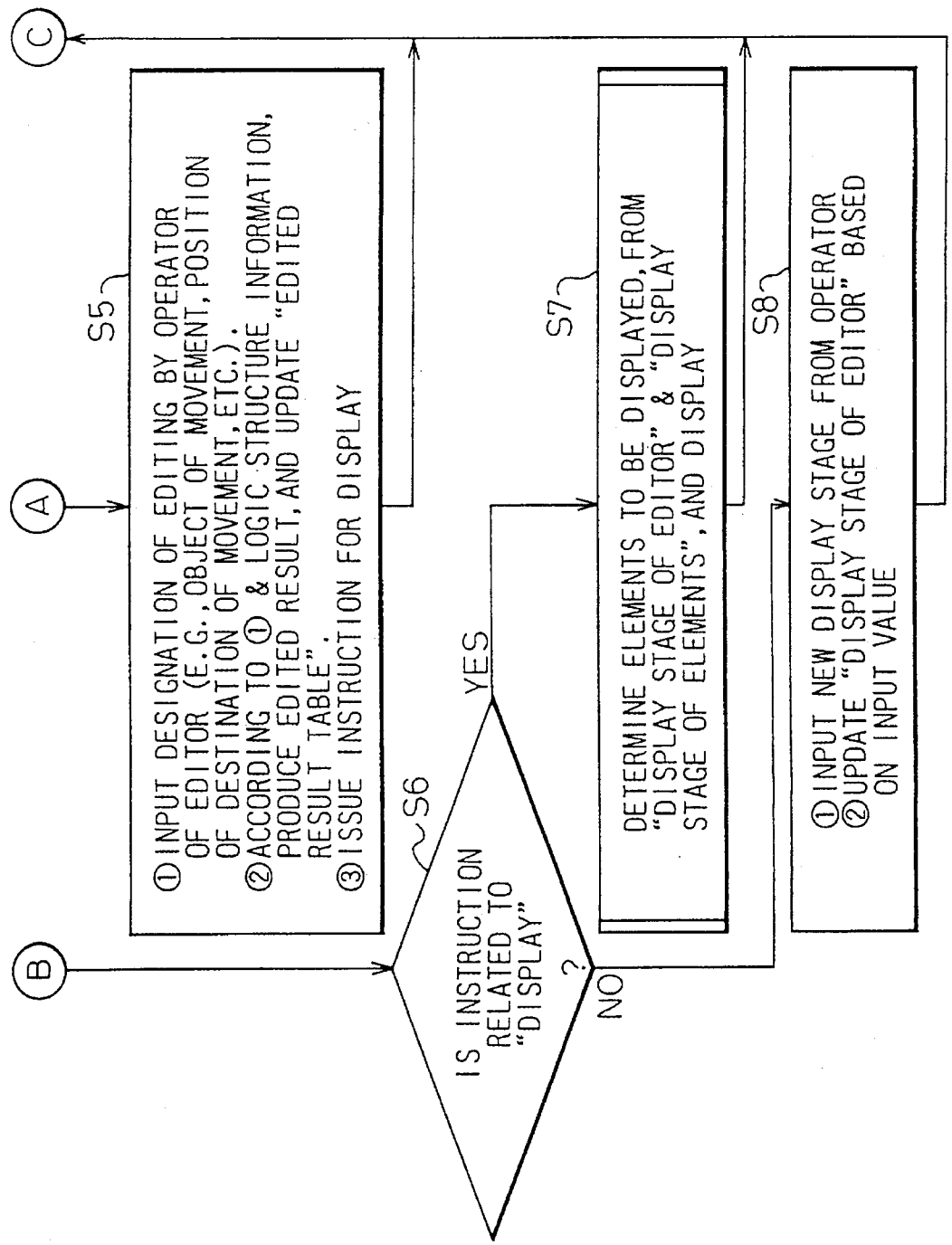

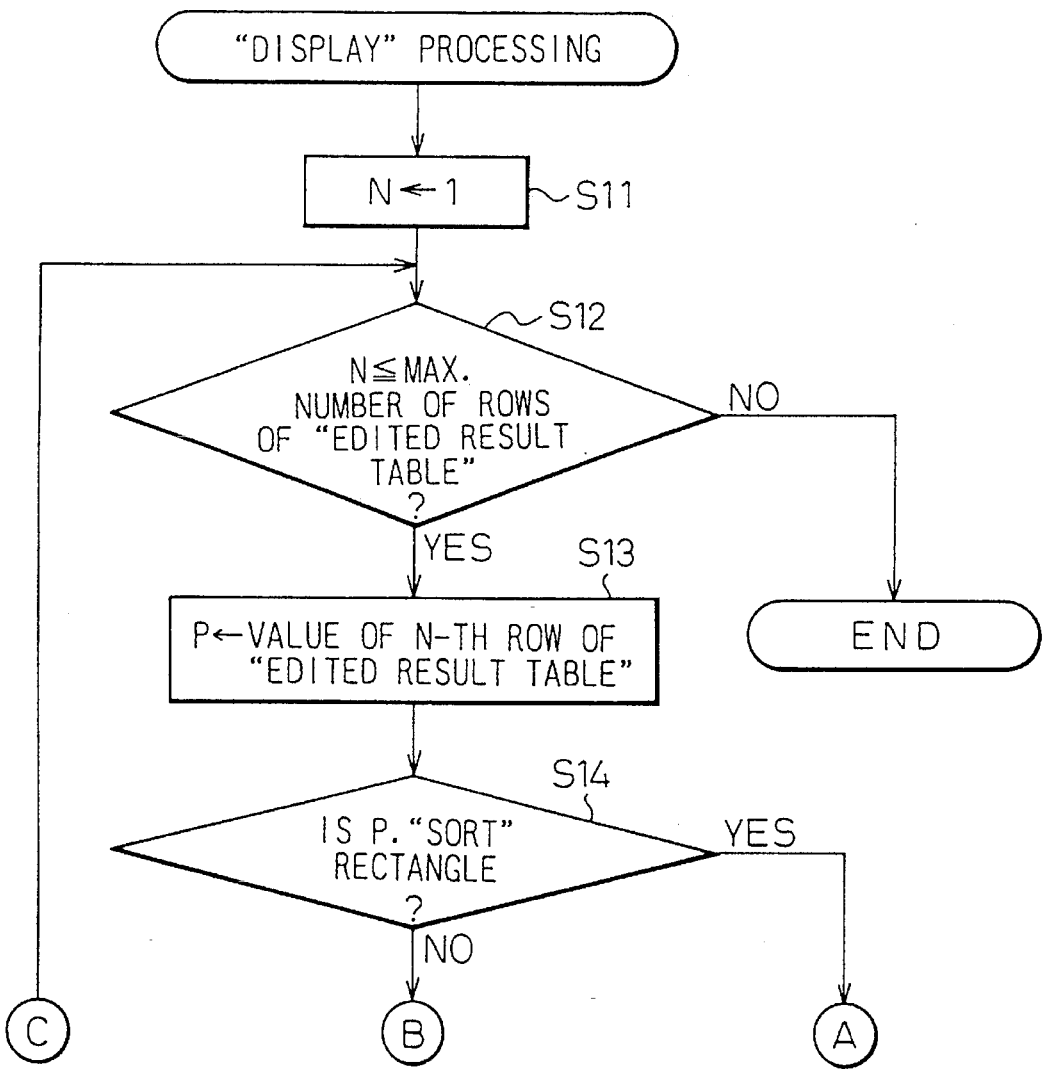

DOCUMENT EDITOR HAVING FUNCTION FOR CONTROLLING DISPLAY PROCESSING OF DETAILS

BACKGROUND OF THE INVENTION

1. Field of the Invention

The present invention relates to a document editor, more particularly, to an art for controlling the display of details according to a logic structure of a graphic element in a document editor for handling the graphic element having the logic structure.

2. Description of the Related Art

In a document editor which handles characters and drawings alike (and has a printing function), it may sometimes be required to suppress the display of details because, for example, what should be focused on is the layout, and information concerning details is unnecessary. Suppressing the details also allows the overall display time interval to be reduced. This requirement often arises when display in a reduced size causes a quantity of information to be displayed for one screen to increase. On the other hand, information concerning details may be needed for the sake of editing or printing. In this case, details must be displayed.

Drawings handled by a document editor in a CASE tool or the like are graphics having logic structures. The document editor executes editings including "move," "copy," and "delete" operations according to the logic structures. Editors that handle graphics having logic structures are characterized by the fact that their modification of a certain edit element may affect other elements.

Graphics having logic structures are, as shown in FIGS. 1a to 1c, graphics in which a certain graphic element and other graphic element have a relationship of "inclusion," a "side-by-side" relationship, or a relationship of "connection." In an example of an inclusive relationship shown in FIG. 1a, graphic elements A1 and A2 included in a graphic element A have the same life span as the graphic element A including them and move together with the graphic element A. In an example of a side-by-side relationship shown in FIG. 1b, side-by-side elements B1 to B4 get larger or smaller independently. If the number or size of a certain element (for example, B2) is changed, the other elements (B1, B3, and B4) are rearranged. In an example of a connective relationship shown in FIG. 1c, if one of connected graphic elements C1 and C2 is moved, a connection line $C_{12}$ linking both the elements follows the movement. If one of the connected elements C1 and C2 is deleted, the connection line $C_{12}$ is also deleted.

A document editor for handling graphics having the above logic structures must meet the requirements that it can control stages, in which details are displayed, according to logic structures while editing and displaying a document containing characters and drawings, and that it can execute edit irrelevant of the display stages.

Conventionally, a CAD system is a well-known example of an editor enabling stepwise display. The CAD system lies in a concept of "layers." The CAD system can edit drawings or characters for each layer and designate display or non-display for each layer. All drawings or characters in a layer for which display is designated can be displayed superposed on each other in a display screen. FIG. 2 shows an example.

In the CAD system, information residing in all layers is displayed on a display screen. For editing, a layer in which an element to be edited resides must be designated independently. In the example of FIG. 2, for editing a circle, layer 1 must be designated. For editing a dimension, layer 2 must be designated. For editing a note, layer 3 must be designated.

Another known example of an editor enabling display with units of stages can reduce a graphic or character in size arbitrarily during edit and display. A character at a certain reduced size is, however, displayed in the form of a drawing, for example, □ or ■. Another known example is a so-called "idea processor," which can display a heading, paragraph, text, and others, with units of stages according to the logic structure of a document.

A system based on a CAD system enabling display with units of stages has a disadvantage that a graphic having a logic structure cannot be handled. In this system, editing is executed in a closed state within each layer. The influence of a result of editing a certain layer cannot be reflected on other layers in a display screen. When it becomes necessary to reflect a result of editing a layer on other different layers, designation of a layer must be changed frequently. This poses a problem that editing and display by an editor cannot be accomplished quickly or efficiently.

Another editors enabling stepwise display have a problem that a graphic having a logic structure cannot be handled. Thus, these editors share the same problems with the CAD system.

SUMMARY OF THE INVENTION

An object of the present invention is to provide a document editor that, during document editing and display, can control stepwise display of details according to a logic structure and edit any element in a selected display stage, and that contributes to a reduction in a quantity of display information and a display time interval.

To achieve the above object, the present invention provides a document editor for editing or displaying elements of a graphic with a logic structure which have an inclusive, side-by-side, or connective relationship mutually. The document editor comprises an editing means for editing any element of a logic structure and reflecting the result of editing on other elements, an output means for externally displaying the result of reflective editing if necessary, and a control means for designating display or non-display of the result of reflective editing for each element of the logic structure and controlling said output means in terms of display or non-display of the result of reflective editing according to the designation.

BRIEF DESCRIPTION OF THE DRAWINGS

Other objects and features of the present invention will be described in detail in conjunction with a preferred embodiment with reference to the appended drawings. In the appended drawings:

FIGS. 1a to 1c are explanatory diagrams concerning influence on elements of a graphic having a logic structure;

FIG. 2 is an explanatory diagram concerning an example of edit and display in a prior art;

FIG. 4 shows a hardware configuration of a document editor as an embodiment for realizing a method of controlling display of details which relates to the present invention;

FIGS. 5a to 5d are explanatory diagrams concerning an example of of Stepwise Details Display Modification realized by the document editor shown in FIG. 4;

FIG. 6 shows an example of a logic structure table stored in the memory shown in FIG. 4;

FIG. 7 shows an example of a display stage table concerning elements which is stored in the memory shown in FIG. 4;

FIG. 8 shows an example of a display state table of an editor which is stored in the memory shown in FIG. 4;

FIGS. 10a and 10b are flowcharts showing editing and display executed by the document editor shown in FIG. 4;

FIGS. 11a and 11b are flowcharts showing details of Display shown in FIG. 10b;

DETAILED DESCRIPTION OF THE PREFERRED EMBODIMENTS

Figure 3A:
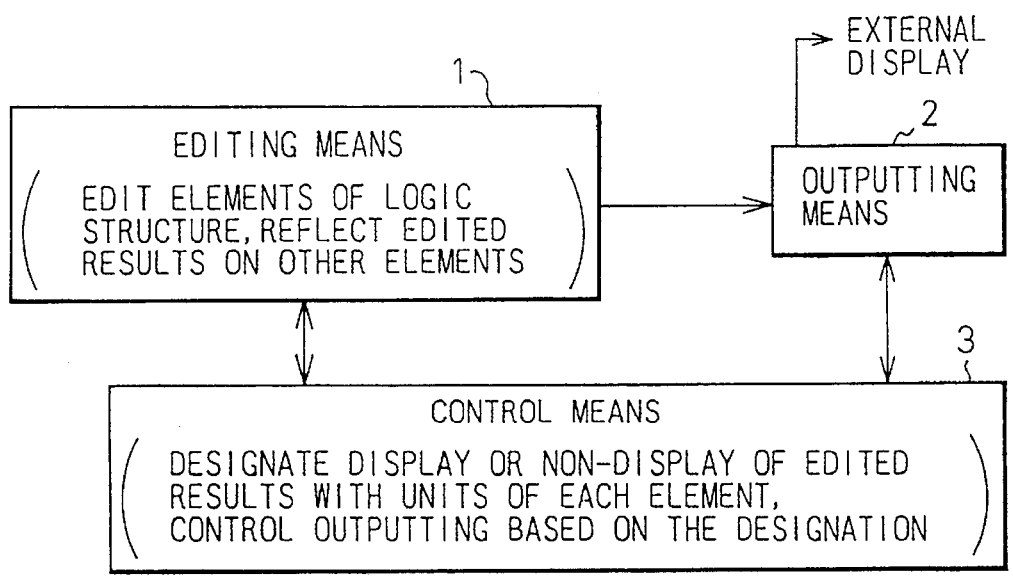
FIGS. 3a and 3b are explanatory diagrams concerning the principles of a document editor, having a function for controlling display of details, which relates to the present invention.
Figure 3B:
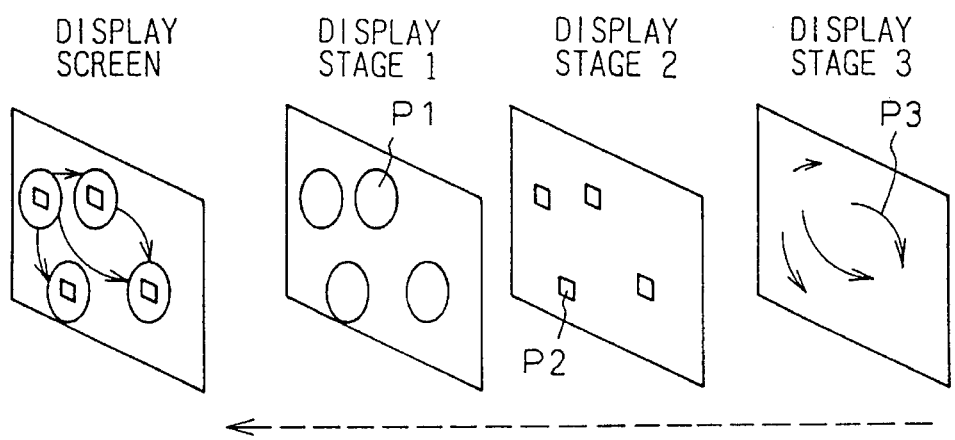
Figure 9A:
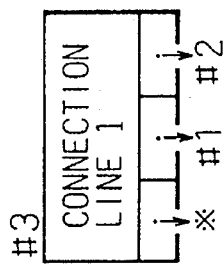
FIGS. 9a to 9e show examples of a result-of-edit table to be stored in the memory shown in FIG. 4.
Figure 9D:
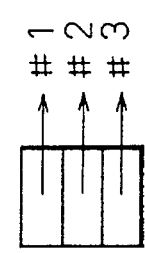
Figure 9B:
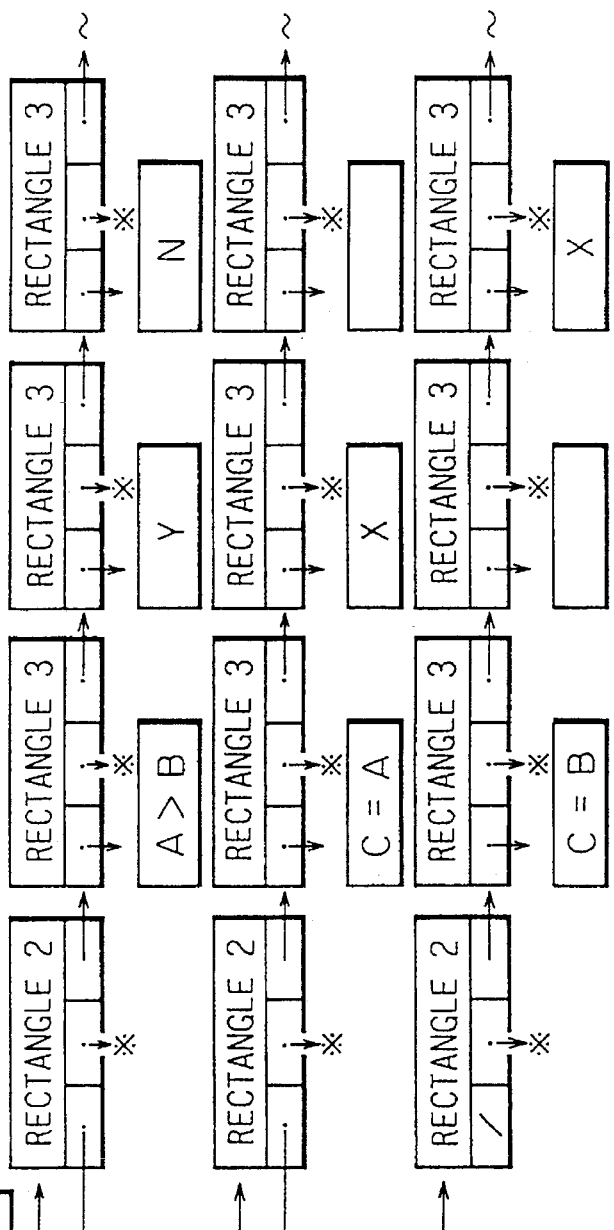
Figure 9C:
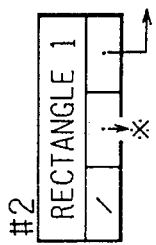
Figure 9E:
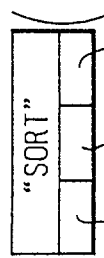

FIGS. 3a and 3b show the principles of a document editor having a function for controlling the display of details relating to the present invention.

As shown in FIG. 3a, the document editor relating to the present invention edits and displays elements of a graphic with a logic structure which have an inclusive, side-by-side, or connective relationship mutually. The document editor comprises an editing means 1 for editing any element of the logic structure and reflecting the result of edit on other elements, an output means 2 for externally displaying the result of reflective editing if necessary, and a control means 3 for designating display or non-display of the result of reflective editing for each element of the logic structure and controlling the output means in terms of display or non-display of the result of reflective editing according to the designation.

In a preferred embodiment of the present invention, which will be described later, the editing means includes a means for setting a plurality of display stages and allocating the elements of the logic structure to respective display stages. The control means includes a means for designating display or non-display in a display stage for each element of the logic structure associated with the display stage.

According to the aforesaid configuration, the control means 3 designates for each element of a logic structure whether or not the result of reflective editing provided by the editing means 1 is output via the output means 2 (display or non-display), and controls display or non-display according to the designation.

During document editing and display, stepwise display of details (display suppression) can be controlled according to a logic structure. As a result, display can be achieved at a required minimum level under any circumstance (a quantity of display information can be reduced). Furthermore, a display time interval can be reduced. Display of required information alone permits intuitive recognition of a graphic.

When a plurality of display stages are set and display and non-display can be designated selectively in each display stage for each element of a logic structure, the following advantages are made available: as shown as an example in FIG. 3b, when all display stages (stages 1, 2, and 3) appear in a display screen, an element residing in any display stage can be edited without changing the designation of a display stage. That is to say, the elements P1, P2, and P3 can be edited in the display screen. In the logic structure of this example, the elements P1 include the elements P2 and the elements P3 connect between the elements P1. As for display, the elements P1 are displayed in display stages 1, 2, and 3. The elements P2 are displayed in the display stages 1 and 2. The elements P3 are displayed only in the display stage 3.

Next, a preferred embodiment of the present invention will be described in detail with reference to FIGS. 4 to 14.

FIG. 4 shows a hardware configuration of a document editor as an embodiment for realizing a method of controlling display of details relating to the present invention.

In FIG. 4, 10 denotes a data bus. Over the bus, a central processing unit (CPU) 11 for controlling document edit and display (especially, stepwise display of details), a memory 12 for storing data required for document edit and display, a data file 13, a keyboard 14 serving as an input means, and a display unit (for example, a CRT) 14 and a printer serving as output means are interconnected. The memory 12 includes a storage area 12A for storing data of a logic structure table defining a logic structure for each element, a storage area 12B for storing data of a display stage table concerning elements, which defines a display stage for each element, a storage area 12C for storing data of a display stage table of an editor which defines a display stage currently selected, and a storage area 12D for storing data of a result-of-edit table defining the current result of edit. In this embodiment, when editing and display is initiated, the above data of the tables are loaded from the data file 13 into the respective storage areas in the memory 12.

In this embodiment, two storage means, as the memory 12 and data file 13, are employed. If the memory has a sufficient capacity, the data file 13 need not always be included for control of display of details relating to the present invention.

Hereinafter, this embodiment is concerned with a notation in which a plurality of decision tables are joined by connection lines (referred to as a multiple-decision table), serving as an example of a logic structure. The logic structure of the multiple-decision table has the following requirements (1) to (3):

(1) A decision table is connected to another decision table.

(2) A decision table is composed of side-by-side rows.

(3) A row includes character fields.

FIGS. 5a to 5d show an example of Details Stepwise Display Modification realized by a document editor relating to this embodiment.

FIG. 5a shows a relationship between elements of a logic structure of a multiple-decision table and display stages. FIGS. 5b, 5c, and 5d show examples of displays in different display stages.

FIGS. 6, 7, 8, and 9a to 9e show examples of a logic structure table, a display stage table concerning elements, a display stage table of an editor, and a edited result table.

In the logic structure table of FIG. 6, a rectangle 1 corresponds to a decision table composed of side-by-side rows. A rectangle 2 corresponds to a row including character fields. A rectangle 3 corresponds to a character field included in a row. A connection line 1 corresponds to a connection line linking two decision tables. In the display stage table concerning elements shown in FIG. 7, a rectangle 1 corresponds to a frame of a decision table. A rectangle 2 corresponds to rows in a decision table. A rectangle 3 corresponds to a character field in a row in a decision table. A connection line 1 corresponds to a connection line linking two decision tables. The display stage table of an editor shown in FIG. 8 indicates that the editor executes display in all the display stages 1, 2, and 3.

Next, edit and display executed by the multiple-decision table editor relating to the embodiment will be described with reference to FIGS. 10a to 14.

FIGS. 10a and 10b are flowcharts showing edit and display executed by the document editor shown in FIG. 4.

At step S1, the CPU 11 loads data from the data file 13 to the memory 12 as part of initialization. Specifically, the data of the logic structure table defining a logic structure for each element (See FIG. 6) is loaded in the storage area 12A. The data of the display stage table concerning elements which defines a display stage for each element (See FIG. 7) is stored in the storage area 12B. The data of the display stage table of an editor which defines a display stage currently selected (See FIG. 8) is loaded in the storage area 12C. The data of the result-of-edit table defining the current result of edit (See FIGS. 9a to 9e) is loaded in the storage area 12D.

Next, at step S2, an instruction is entered at the keyboard 14. At step S3, the CPU 11 determines whether an instruction is being entered. If the result of the determination is in the affirmative, control is passed to step S4. If the result of the determination is in the negative, this routine terminates.

At step S4, the CPU 11 determines whether the instruction indicates an edit mode. If the result of the determination is in the positive, control is passed to step S5. If the result of the determination is in the negative, control is passed to step S6. At step S5, edit is executed by following the sub-steps (1) to (3). Specifically, when an edit mode is "move," edit parameters (for example, object to be moved, and destination) entered by an operator of the editor are input. Based on the input data and the information concerning a logic structure, the result of editing is produced, the result-of-edit table is updated, and a display instruction is issued. When the processing at step S5 terminates, control is returned to step S2.

Similarly, at step S6, the CPU 11 determines whether the instruction indicates Display or Display Stage Modification. If the result of the determination is in the affirmative, control is passed to step S7. If the result of the determination is in the negative, control is passed to step S8. At step S7, display is executed. Specifically, elements to be displayed are determined by referencing the display stage table of an editor and the display stage table concerning elements, and then displayed. When the processing at step S7 terminates, control is returned to step S2.

At step S8, Display Stage Modification which is achieved by following the sub-steps (1) and (2) in FIG. 10b is executed. Specifically, an operator of the editor enters a new display stage at the keyboard 14. Based on the input value, the display stage table of an editor is updated. When the processing at step S8 terminates, control is returned to step S2.

Figure 11B:
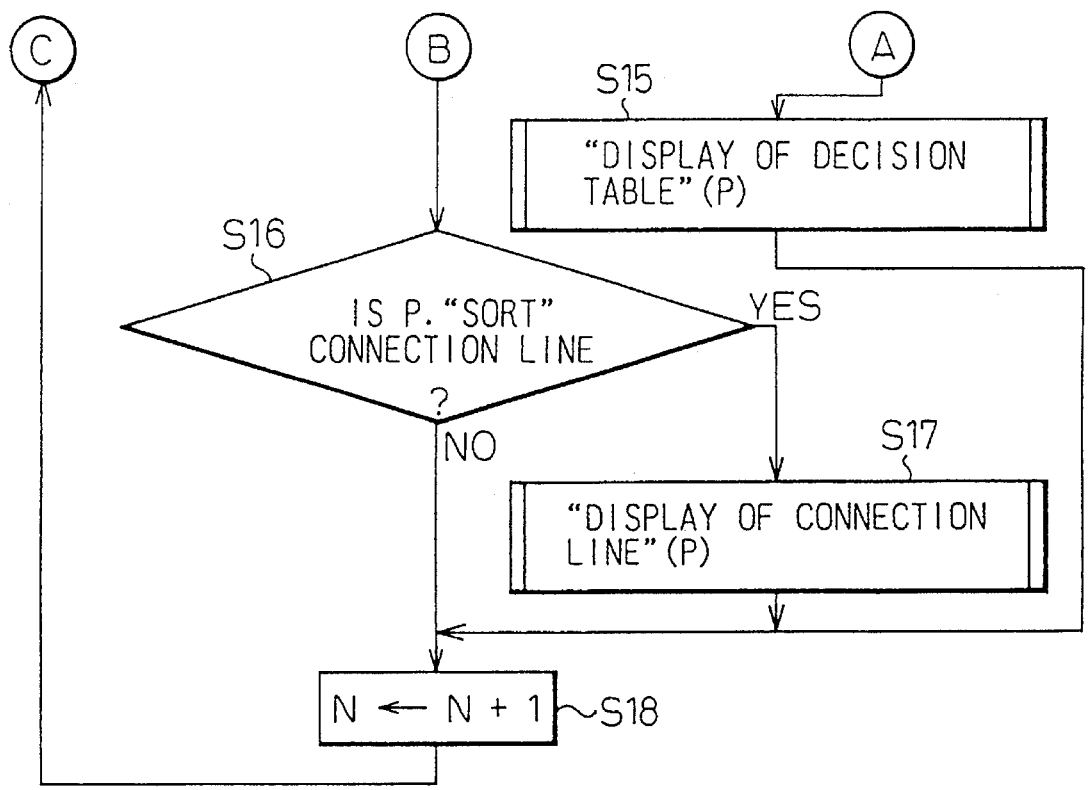

FIGS. 11a and 11b are flowcharts showing the aforesaid display step (step S7) in detail.

At step S11, initialization is executed (N is set to 1). At step S12, the CPU 11 determines whether the N value is less than a maximum number of rows existent in the edited result table (See FIG. 9a). If the result of the determination is in the affirmative, control is passed to step S13. If the result of the determination is in the negative, this routine terminates. At step S13, the value specified for the N-th row in the edited result table is set as a value of an area P.

Next, at step S14, the CPU 11 determines whether P."SORT" specifies a rectangle. If the result of the determination is in the affirmative, control is passed to step S15. If the result of the determination is in the negative, control is passed to step S16. At step S15, Decision Table Display (P) is executed. Thereafter, control is passed to step S18.

At step S16, the CPU 11 determines whether P.type specifies a connection line. If the result of the determination is in the affirmative, control is passed to step S18. At step S17, Connection Line Display (P) is executed. Thereafter, control is passed to step S18.

At step S18, the N value is updated (set to N+1). Control is then returned to step S12. The aforesaid routine is rerun.

Display shown in FIGS. 11a and 11b checks for each of all the elements in the current result-of-edit table if display or non-display is designated.

Figure 12:
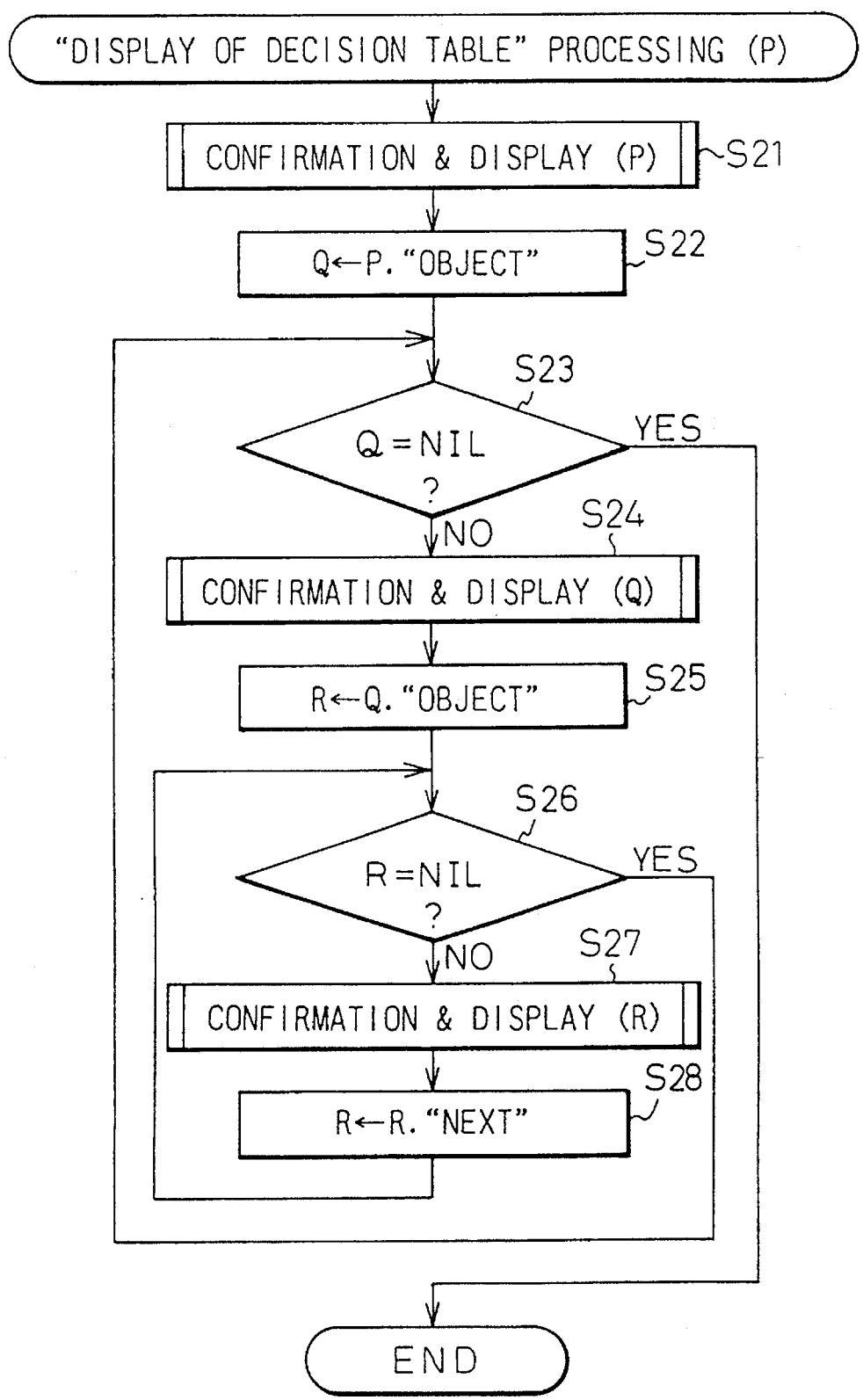
FIG. 12 is a flowchart showing Decision Table Display shown in FIG. 11b.

FIG. 12 is a flowchart showing the aforesaid Decision Table Display (step S15).

At step S21, Confirmation and Display (P) is executed. A rectangle 1 appears. At step S22, an area Q is specified in P."OBJECT".

Next, at step S23, the CPU 11 determines whether the area Q (in this case, a row in a decision table) is nil or not included in a decision table. If the result of the determination is in the affirmative, this routine terminates. If the result of the determination is in the negative, control is passed to step S24. At step S24, Confirmation and Display (Q) is executed. A rectangle 2 appears. At step S25, an area R is specified in Q."OBJECT".

Next, at step S26, the CPU 11 determines whether the area R (character field in a row of a decision table) is nil. If the result of the determination is in the affirmative, control is returned to step S23. If the result of the determination is in the negative, control is passed to step S27. At step S27, Confirmation and Display (R) is executed. A rectangle 3 appears. At step S28, an area R is specified in R."NEXT". Thereafter, control is returned to step S26. The aforesaid routine is then rerun.

Figure 13:
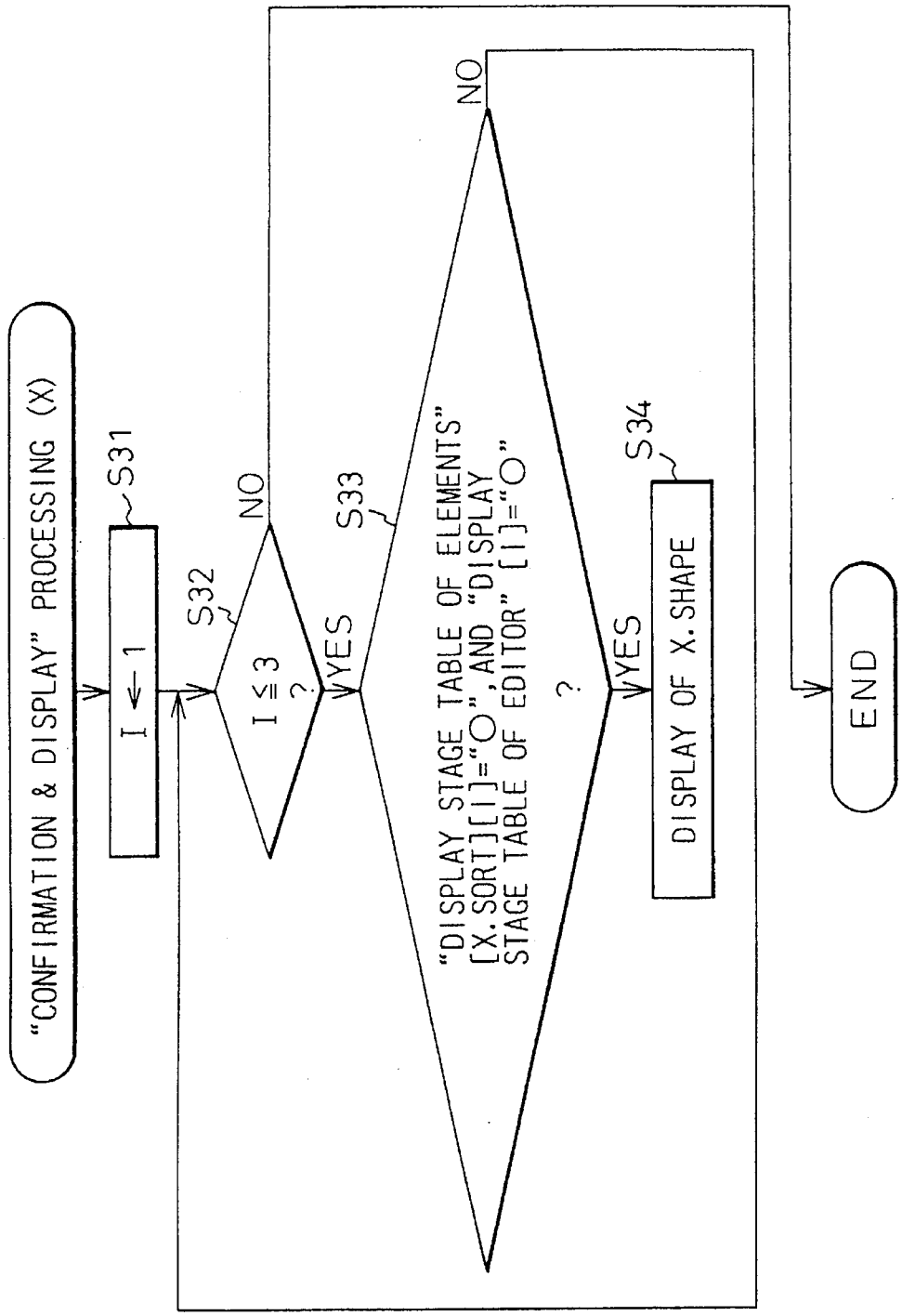
FIG. 13 is a flowchart showing Confirmation and Display shown in FIG. 12.

FIG. 13 is a flowchart showing the aforesaid Confirmation and Display (steps S21, S24, and S27).

At step S31, initialization is executed (I is set to 1). At step S32, the CPU 11 determines whether the I value is 3 or less. If the result of the determination is in the affirmative, control is passed to step S33. If the result of the determination is in the negative, this routine terminates.

At step S33, the CPU 11 determines whether a circle (this means "display" state) is specified at an intersection between items of X."SORT" and I in the display stage table concerning elements and whether a circle (this means "display" state) is specified at I in the display stage table of an editor. If the result of the determination is in the affirmative, control is passed to step S34. If the result of the determination is in the negative, control is returned to step S32. At step S34, Display specifying X.shape is executed. Thereafter, control is returned to step S32. The aforesaid routine is then rerun.

As mentioned above, Confirmation and Display shown in FIG. 13 displays a certain graphic X only in a display stage in which the graphic X should be displayed.

Figure 14:
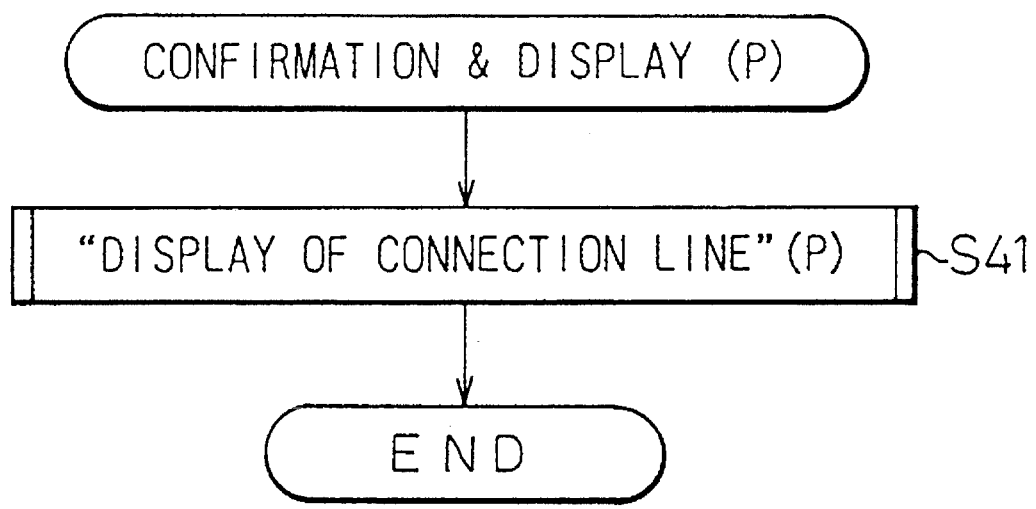
FIG. 14 is a flowchart showing Connection Line Display shown in FIG. 11b.

FIG. 14 is a flowchart showing the aforesaid Connection Line Display (step S17).

This routine is similar to the one shown in FIG. 13, which is Confirmation and Display (P) (Step S41). This routine displays a connection line 1.

As described above, the multiple-decision table editor relating to this embodiment selectively designates output and non-output of the result of edit for each element of a logic structure and controls display and non-display of the result of edit according to the designation. During document edit and display, stepwise display of details can therefore be controlled finely according to a logic structure.

Thus, display can be achieved on a required minimum level under any circumstance (that is, the quantity of display information can be minimized). A display time interval can be reduced. Display of necessary information alone permits intuitive recognition of a graphic.

The present invention has been disclosed and described in conjunction with one embodiment. It will be apparent to any person with ordinary skill in the art that other embodiments and modifications of the present invention are possible without departing from the essential features thereof.

What is claimed is:

1. A document editor for editing and displaying elements of a graphic with a logic structure including at least one of inclusive, side-by-side, and connective relationships, comprising:

editing means for editing at least one element of the graphic having the logic structure and obtaining a reflected result of the editing on other elements, said editing means including means for setting display stages and allocating the elements of the graphic to respective display stages;

output means, having a display unit, for displaying the reflected result of the editing; and control means for selectively designating display or non-display in the respective display stages for each element of the graphic having the logic structure associated with the respective display stages, including the reflected result of the editing, and for controlling, based on the designating, said display unit to display or not display the reflected result of the editing.

2. A document editor according to claim 1, further comprising memory means for storing data required for the editing and the displaying of the elements of the graphic having the logic structure, said memory means including a first storage area for storing a logic structure table defining an element logic structure for each element, a second storage area for storing a display stage table concerning the elements defining at least one display stage for each element, a third storage area for storing a current display stage table of said document editor defining a currently selected display stage, and a fourth storage area for storing an edited result table defining a current result of editing.

3. A document editor according to claim 1, wherein said control means pre-designates display or non-display of the editing and the reflected result of the editing for each element of the graphic having the logic structure.

4. A document editor according to claim 1, wherein said control means designates display or non-display of the editing and the reflected result of the editing for each element of the graphic having the logic structure during the editing executed by said editing means.

* * * * *